United States Patent Office 2,946,791
Patented July 26, 1960

2,946,791

2-DIARYLALKYL-3,4,5,6-TETRAHYDRO-PYRIMIDINES AND PROCESSES

Clinton A. Dornfeld, Glenview, Ill., assignor to G. D. Searle & Co., Chicago, Ill., a corporation of Delaware No Drawing. Filed May 2, 1957, Ser. No. 656,495

12 Claims. (Cl. 260—251)

This invention derives from research on 2-diarylalkyl-3,4,5,6-tetrahydropyrimidines designed to produce novel chemical compositions of particular pharmacological utility. The area of investigation is defined at least in part by the formula

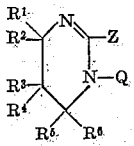

wherein $R^1$, $R^2$, $R^3$, $R^4$, $R^5$, and $R^6$ are hydrogen or lower alkyl radicals; Q is hydrogen or a lower alkyl or acyl radical; and Z is a lower alkyl radical in which each of two hydrogens is replaced by an aryl radical—for example, a phenyl or naphthyl group, optionally substituted by one or more halogens and/or lower alkyl radicals.

Illustrative of the lower alkyl radicals contemplated in the foregoing formula are methyl, ethyl, propyl, isopropyl, butyl, isobutyl, sec-butyl, tert-butyl, pentyl, isopentyl, tert-pentyl, neopentyl, hexyl, isohexyl, heptyl, and like $C_nH_{2n+1}$ radicals wherein n is a positive integer amounting to less than nine.

The aryl substituents called for by Z in the formula attached to either the same or different carbon atoms of the lower alkyl radical involved, subject of course to the steric limitations inherent in disposing molecular aggregates of the size of those represented by—typically—the naphthyl grouping. It follows that whereas the benzhydryl radical is perhaps the simplest embodiment of Z, such diaryl (lower alkyl) groupings as benzhydrylmethyl, β-phenylphenethyl, dibenzylmethyl, α,γ-diphenylpropyl, γ-phenyl-2-naphthylpropyl, α,δ-diphenylbutyl, β-methyl-β-phenylphenethyl, and δ-1-naphthyl-1-naphthylhexyl are all within the meaning of the term set forth. Likewise comprehended are the nuclearly halogenated and alkylated derivatives of the specified diarylalkyl moieties.

As to the acyl radicals referred to by Q in the formula, these include both lower alkanoyl

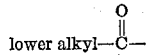

and benzoyl groupings.

In the course of the prescribed work, it was determined that the aforesaid 2-diarylalkyl-3,4,5,6-tetrahydropyrimidines possess a variety of interesting pharmacological properties—for instance, vasodilating activity. More particularly, however, and indeed this is the core of the invention here disclosed and claimed, it was found that especially 2-diphenylalkyl-3,4,5,6-tetrahydropyrimidines are uniquely characterized by a combination of vasodiating and extremely potent diuretic effects uncomplicated by the adverse pressor-depressor response which detracts from the utility of other tetrahydropyrimidines superficially related. Moreover, the latter compounds are readily accessible via the manufacturing methods hereinafter described; and thus constitute a congeneric group of pharmacologically valuable substances of great practical importance.

This invention, accordingly, comprises compositions of the formula

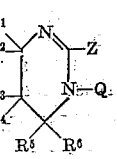

wherein $R^1$, $R^2$, $R^3$, $R^4$, $R^5$, $R^6$, and Q are defined as above; and Z' is restricted to optionally-substituted diphenyl (lower alkyl) radicals, the substituents referred to being nuclear halogen atoms and/or lower alkyl groupings. Additionally comprehended are the methods developed for preparing this group of compounds.

This application is a continuation-in-part of applicant's prior copending application Serial No. 461,911, filed October 12, 1954, now abandoned.

Equivalent to the tertiary bases of this invention, and correspondingly adapted to its uses are the non-toxic acid addition salts preparable by interaction of a disclosed base with an inorganic or strong organic acid. These salts have the formula

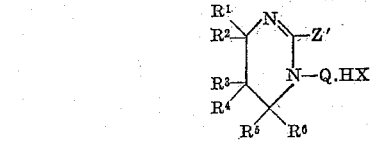

wherein $R^1$, $R^2$, $R^3$, $R^4$, $R^5$, $R^6$, Q, and Z' have the meanings assigned above; and X is one equivalent of an anion—for example, chloride, bromide, iodide, methyl sulfate, ethyl sulfate, benzenesulfonate, toluenesulfonate, tartrate, succinate, malate, acetate, citrate, nitrate, sulfate, phosphate, sulfamate, nicotinate, and the like—which, in combination with the cationic portion of a salt aforesaid, is neither toxic nor otherwise undesirable in pharmacological dosage.

Those of the subject compounds wherein Q is hydrogen are conveniently prepared by condensing an appropriate diamine, of the formula

$$H_2NCR^1R^2CR^3R^4CR^5R^6NH_2$$

with a suitable acid, of the formula

X'COOH $R^1$, $R^2$, $R^3$, $R^4$, $R^5$, $R^6$, and Z' having the meanings assigned above, at temperatures of the order of 85° to 200° centigrade for periods of time ranging from a few hours to upwards of several days, using an inert, organic, solvent, reaction medium sufficiently high boiling to permit operating at convenient pressures. Satisfactory media thus comprise such as xylene, ethylbenzene, cumene, cymene, and the like. In a preferred embodiment of the processes of this invention, water formed during the course of the condensation is concurrently removed—for example, by means of a mechanical separator.

The N-(lower alkyl) derivatives of this invention are prepared from the corresponding compositions wherein Q is hydrogen by heating at 50–100° centigrade with an alkyl halide of choice, using a ketonic solvent as the reaction medium. The product is obtained in the form of an acid addition salt, which, on alkalization, yields the desired tertiary base.

The claimed N-acyl compounds are formed from the corresponding hydro derivatives by admixture with a selected acid chloride or anhydride in the presence of a basic catalyst, such as pyridine.

The following examples describe in detail certain of the compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of material in parts by weight, except as otherwise noted.

EXAMPLE 1

A. *2 - benzhydryl - 3,4,5,6 - tetrahydropyrimidine.*—A mixture of 212 parts of diphenylacetic acid, 111 parts of 1,3-propanediamine, and 435 parts of xylene is heated for 16 hours at reflux temperatures, using a separator to remove from the reaction mixture the water formed in process. Solvent and excess starting material are stripped, distillation being initiated at atmospheric pressures and completed at 130° C. under 10 mm. pressure. The residue is extracted with chloroform, and this extract, in turn, is extracted with dilute muriatic acid. The acid solution is made alkaline with aqueous caustic soda, precipitating purified 2-benzhydryl-3,4,5,6-tetrahydropyrimidine, which is taken up in chloroform. The chloroform solution is dried over potassium carbonate and then stripped of solvent by evaporation. The product thus obtained, upon recrystallization from 400 parts of butanone, melts at approximately 164° C. It has the formula

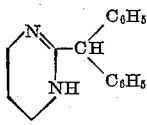

B. *2 - benzhydryl - 3,4,5,6 - tetrahydropyrimidine hydrochloride.*—To a solution of 20 parts of 2-benzhydryl-3,4,5,6-tetrahydropyrimidine in 80 parts of isopropyl alcohol is added, with agitation, 10 parts of a 27% absolute isopropyl alcohol solution of hydrogen chloride. The desired salt crystallizes out as the reaction mixture stands, refrigerated. Anhydrous ether can be added to assist in the workup. The pure product thus obtained melts at approximately 202° C.

C. *2 - benzhydryl - 3,4,5,6 - tetrahydropyrimidine nicotinate.*—A mixture of 100 parts of 2-benzhydryl-3,4,5,6-tetrahydropyrimidine and 49 parts of nicotinic acid is dissolved in 405 parts of hot butanone. Upon cooling, 2 - benzhydryl - 3,4,5,6 - tetrahydropyrimidine nicotinate crystallizes out. The product melts at 126–127° C.

EXAMPLE 2

*2 - benzhydryl - 3 - acetyl - 3,4,5,6 - tetrahydropyrimidine.*—To a solution of 18 parts of 2-benzhydryl-3,4,5,6-tetrahydropyrimidine in 200 parts of pyridine is added, with agitation at 35° C., 12 parts of acetic anhydride. The reaction mixture is maintained overnight at room temperatures, and then dumped into an excess of ice water, thereby precipitating 2-benzhydryl-3-acetyl-3,4,5,6-tetrahydropyrimidine, of the formula

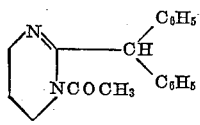

EXAMPLE 3

A. *2 - benzhydryl - 3 - methyl - 3,4,5,6 - tetrahydropyrimidine hydrobromide.*—A mixture of 18 parts of 2-benzhydryl-3,4,5,6-tetrahydropyrimidine, 7 parts of methyl bromide, and 160 parts of butanone is maintained in a sealed kettle at 65° C. for 100 hours. A clear solution results within approximately 1 hour, following which precipitation occurs. At the end of the prescribed reaction period, the contents of the kettle are preliminarily chilled and then filtered at room temperatures. The white precipitate thus isolated is 2-benzhydryl-3-methyl-3,4,5,6-tetrahydropyrimidine hydrobromide which, recrystallized from 2-propanol, melts at 202–203° C. The product has the formula

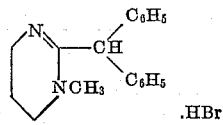

B. *2 - benzhydryl - 3 - methyl - 3,4,5,6 - tetrahydropyrimidine.*—An aqueous solution of the hydrobromide of the preceding Part A of this example is made alkaline and then extracted with ether. The ether extract is dried over anhydrous sodium sulfate and subsequently stripped of solvent by evaporation. There is obtained by this means an oily residue which crystallizes on standing. This material is 2-benzhydryl-3-methyl-3,4,5,6-tetrahydropyrimidine, the melting point of which is 79–80° C.

C. *2 - benzhydryl - 3 - methyl - 3,4,5,6 - tetrahydropyrimidine hydrochloride.*—To approximately 7 parts of the base of the preceding Part B of this example dissolved in 20 parts of hot butanone is added, with agitation, 4 parts of a 24% absolute isopropyl alcohol solution of hydrogen chloride. The reaction mixture is stored for several days at 0–5° C., following which the syrupy precipitate thrown down is washed several times by decantation with anhydrous ether and then heated in vacuo at 80° C. for a few hours. The glass-like product which results is 2-benzhydryl-3-methyl-3,4,5,6-tetrahydropyrimidine hydrochloride, an exceedingly hydroscopic material.

EXAMPLE 4

*2-benzhydryl-3-octyl-3,4,5,6 - tetrahydropyrimidine hydrobromide.*—Using the technique of Example 3A, 25 parts of 2-benzhydryl-3,4,5,6-tetrahydropyrimidine in 200 parts of butanone is reacted with 19 parts of 1-bromooctane to give 2-benzhydryl-3-octyl-3,4,5,6-tetrahydropyrimidine hydrobromide, the formula of which is

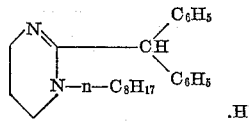

EXAMPLE 5

A. *2-benzhydryl-4-methyl-3,4,5,6-tetrahydropyrimidine and 2 - benzhydryl - 6 - methyl-3,4,5,6-tetrahydropyrimidine.*—Using the procedure described in Example 1A, 42 parts of diphenylacetic acid, 18 parts of 1,3-butanediamine, and 540 parts of xylene are reacted to give, after a 48 hour heating period, a tan solid which, crystallized from butanone and dried in vacuo at 60° C. overnight, melts at approximately 134–135° C. The product is a mixture of the 4- and 6-methyl isomers shown below:

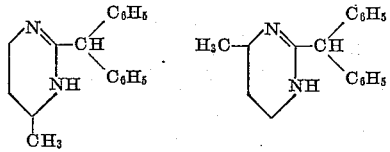

B. *2-benzhydryl-4-methyl-3,4,5,6-tetrahydropyrimidine hydrochloride and 2-benzhydryl-6-methyl-3,4,5,6-tetrahydropyrimidine hydrochloride.*—The isomeric bases of the preceding Part A of this example are converted to corresponding hydrochloric acid addition salts by dissolution in hot butanone and treatment with one equivalent of hydrogen chloride dissolved in isopropyl alcohol according to the technique of Example 3C. After standing in the cold overnight, the reactants are mixed with an equal volume of anhydrous ether to induce crystallization. The product thus obtained, which is isolated by filtration and dried in vacuo at approximately 80° C. overnight, melts sharply at 191° C.

EXAMPLE 6

A. *2-benzhydryl-5-methyl-3,4,5,6-tetrahydropyrimidine.*—A mixture of 18 parts of 2-methyl-1,3-propanediamine, 42 parts of diphenylacetic acid, and 480 parts of xylene is heated at the boiling point under reflux for 24 hours, during which water formed in process is concurrently trapped and discarded. The reaction mixture is then twice extracted with dilute aqueous muriatic acid (20 parts of concentrated acid and 800 parts of water), following which the aqueous extracts are combined and washed three times with ether. Upon alkalization, 2-benzhydryl-5-methyl-3,4,5,6-tetrahydropyrimidine is thrown down as a white precipitate which, isolated on a filter, washed with water, and dried in vacuo at 90° C. overnight, melts at approximately 165° C. The product has the formula

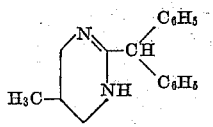

B. *2-benzhydryl-5-methyl-3,4,5,6-tetrahydropyrimidine hydrochloride.*—To 22 parts of 2-benzhydryl-5-methyl-3,4,5,6-tetrahydropyrimidine in a hot mixture of 80 parts of butanone and just sufficient 2-propanol to effect solution is added 16 parts of 2-propanol containing one equivalent of hydrogen chloride. The reaction mixture is stored in the cold overnight. The crystalline precipitate which results is 2-benzhydryl-5-methyl-3,4,5,6-tetrahydropyrimidine hydrochloride, which melts at 202–203° C.

EXAMPLE 7

A. *2-benzhydryl-5,5-dimethyl-3,4,5,6-tetrahydropyrimidine.*—In accordance with the procedure detailed in Example 6A, 42 parts of diphenylacetic acid, 20 parts of 2,2-dimethyl-1,3-propanediamine, and 480 parts of xylene are reacted together for 40 hours and then allowed to stand in the cold overnight. The white precipitate which results is filtered off and dried in vacuo at 80° C. This material is 2-benzhydryl-5,5-dimethyl-3,4,5,6-tetrahydropyrimidine, which melts at 147–149° C., and has the formula

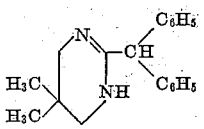

B. *2-benzhydryl-5,5-dimethyl-3,4,5,6-tetrahydropyrimidine hydrochloride.*—Interaction of 10 parts of 2-benzhydryl-5,5-dimethyl-3,4,5,6-tetrahydropyrimidine dissolved in 40 parts of butanone and one equivalent of hydrogen chloride dissolved in 2-propanol affords the hydrochloric acid salt, which, recrystallized from 2-propanol, melts at 260–261° C.

EXAMPLE 8

*2-benzhydryl-3-benzoyl-5,5-dimethyl-3,4,5,6-tetrahydropyrimidine.*—To a solution of 14 parts of 2-benzhydryl-5,5-dimethyl-3,4,5,6-tetrahydropyrimidine in 175 parts of pyridine is cautiously added, with agitation, 10 parts of benzoyl chloride. The reactants are maintained at room temperatures. After 12 hours, the reaction mixture is dumped into cold water, precipitating the desired 2-benzhydryl-3-benzoyl-5,5-dimethyl-3,4,5,6-tetrahydropyrimidine, which has the formula

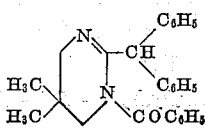

EXAMPLE 9

A. *2-benzhydryl-5-ethyl-5-methyl-3,4,5,6-tetrahydropyrimidine.*—Approximately 37 parts of diphenylacetic acid is condensed with 18 parts of 2-ethyl-2-methyl-1,3-propanediamine in 480 parts of xylene at the boiling point, water being removed as formed. After 3 days, the reaction mixture is filtered hot and then refrigerated. The precipitate which forms is further purified by distillation. A fraction boiling at 190° C. under 0.3 mm. pressure is 2-benzhydryl-5-ethyl-5-methyl-3,4,5,6-tetrahydropyrimidine. The product melts at 132–133° C. and has the formula

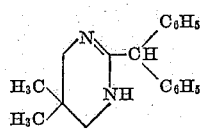

B. *2-benzhydryl-5-ethyl-5-methyl-3,4,5,6-tetrahydropyrimidine hydrochloride.*—Approximately 17 parts of the base of the preceding Part A of this example dissolved in 80 parts of warm butanone is converted to the corresponding acid addition salt upon introduction of one equivalent of hydrogen chloride dissolved in isopropyl alcohol according to the technique of Example 3C. A precipitate forms immediately. The reaction mixture is let stand at room temperatures to permit completion of crystallization, whereupon the desired product is filtered off and dried in vacuo at 80° C. overnight. 2-benzhydryl-5-ethyl-5-methyl-3,4,5,6-tetrahydropyrimidine hydrochloride melts at approximately 266–267° C.

EXAMPLE 10

*2-benzhydryl-5-tert-butyl-5-methyl-3,4,5,6-tetrahydropyrimidine.*—A mixture of 47 parts of diphenylacetic acid, 35 parts of 2-tert-butyl-2-methyl-1,3-propanediamine, and 540 parts of cymene is heated at the boiling point under reflux, water being trapped as formed in process. Approximately 4 parts of water is collected during the first hour of reflux. After 4 days, solvent is distilled from the reaction mixture at atmospheric pressures, and the mixture is then diluted with ether and extracted with dilute muriatic acid. The acid extract is wased with ether and then made alkaline. The oily precipitate which forms is extracted into ether, and this extract is dried over anhydrous potassium carbonate and finally stripped of solvent by evaporation. The residue is 2-benzhydryl-5-tert-butyl-5-methyl-3,4,5,6-tetrahydropyrimidine, of the formula

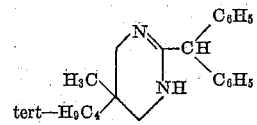

EXAMPLE 11

A. *2-benzhydryl-5,5-diethyl-3,4,5,6-tetrahydropyrimidine.*—Interaction of 21 parts of diphenylacetic acid and 13 parts of 2,2-diethyl-1,3-propanediamine in approximately 240 parts of xylene according to the technique detailed in Example 9A produces a material which distills at 190° C. under 0.1 mm. pressure and melts at 134–135° C. The white crystalline product thus obtained is 2-benzhydryl-5,5-diethyl-3,4,5,6-tetrahydropyrimidine, of the formula

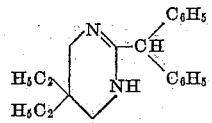

B. *2-benzhydryl-5,5-diethyl-3,4,5,6-tetrahydropyrimidine hydrochloride.*—To approximately 10 parts of the base from the preceding Part A of this example dissolved in 40 parts of hot butanone is added a slight excess of hydrogen chloride dissolved in isopropyl alcohol. The crystalline product thrown down is 2-benzhydryl-5,5-diethyl-3,4,5,6-tetrahydropyrimidine hydrochloride which, recovered on a filter and dried in vacuo at 80° C. overnight, melts at approximately 227–228° C.

EXAMPLE 12

A. *2 - benzhydryl - 4,6,6 - trimethyl-3,4,5,6-tetrahydropyrimidine.*—A solution of 26 parts of 2-methyl-2,4-pentanediamine and 42 parts of diphenylacetic acid in 480 parts of cymene is maintained at the boiling point under reflux for 4 days, during which time water formed in process is concurrently removed. A slight excess of anhydrous hydrogen chloride dissolved in isopropyl alcohol is then introduced, precipitating a gummy solid which is isolated by decantation of the supernatant solvent therefrom. The solid is taken up in warm water, following which the solution thus obtained is washed with xylene, filtered, and finally made alkaline with aqueous caustic. The oil thrown down is extracted into ether, and the resultant ethereal solution is dried over anhydrous potassium carbonate and thereupon stripped of solvent by evaporation. Distillation of the residue affords a fraction boiling at 140° C. under 0.1 mm. pressure, which is 2-benzhydryl-4,6,6-trimethyl-3,4,5,6-tetrahydropyrimidine of the formula

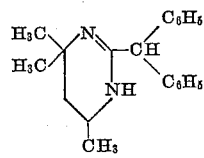

B. *2 - benzhydryl - 4,6,6 - trimethyl-3,4,5,6-tetrahydropyrimidine hydrochloride.*—The base of the foregoing Part A of this example is converted to the corresponding acid addition salt by treatment with hydrogen chloride in the manner described in Example 3C. An oil is precipitated which is washed by successive decantation with anhydrous ether and a small amount of dioxane. On standing in contact with dioxane, the oil crystallizes in a form substantially insoluble in either dioxane or butanone. Recrystallization from isopropyl alcohol affords pure, colorless 2-benzhydryl-4,6,6-trimethyl-3,4,5,6-tetrahydropyrimidine hydrochloride melting at approximately 238° C.

EXAMPLE 13

A. *2-benzhydrylmethyl-3,4,5,6-tetrahydropyrimidine.*—Interaction of 45 parts of 3,3-diphenylpropionic acid and 15 parts of 1,3-propanediamine in 480 parts of xylene at the boiling point under reflux, and with water being removed as formed, produces, after 17 hours, a product which is isolated by distilling off the xylene, taking the residue up in dilute muriatic acid, washing with ether, basifying to precipitate an oil which is extracted into ether, evaporating the ether, and crystallizing the residue from toluene. The pure white 2-benzhydrylmethyl-3,4,5,6-tetrahydropyrimidine thus obtained melts at 109–110° C. and has the formula

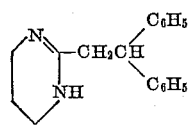

B. *2 - benzhydrylmethyl - 3,4,5,6 - tetrahydropyrimidine hydrochloride.*—From the base of the preceding Part A of this example is obtained, upon treatment with hydrogen chloride dissolved in isopropyl alcohol according to the technique detailed in Example 3C, a crystalline precipitate of 2-benzhydrylmethyl-3,4,5,6-tetrahydropyrimidine hydrochloride, the melting point of which is approximately 177° C.

EXAMPLE 14

*4,6 - dibutyl - 2 - (p,p' - dimethylbenzhydryl - 3,4,5,6-tetrahydropyrimidine.*—From 24 parts of di(p-tolyl)acetic acid and 29 parts of 5,7-undecanediamine in 50 parts of xylene is obtained, by the procedure of Example 1A, 4,6-dibutyl - 2 - (p,p' - dimethylbenzhydryl) - 3,4,5,6-tetrahydropyrimidine, the formula of which is

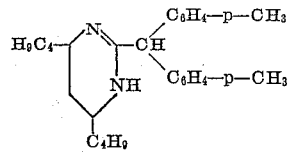

EXAMPLE 15

*2 - (o,m,p - trimethylbenzhydryl) - 3,4,5,6 - tetrahydropyrimidine.*—From 25 parts of 2-mesityl-2-phenylacetic acid and 11 parts of 1,3-propanediamine in 45 parts of xylene is obtained, by the procedure of Example 1A, 2 - (o,m,p - trimethylbenzhydryl) - 3,4,5,6 - tetrahydropyrimidine, the formula of which is

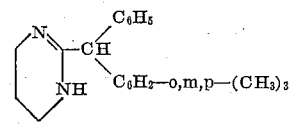

EXAMPLE 16

*4,6 - diethyl - 2 - (p - ethylbenzhydrylmethyl - 3,4,5,6-tetrahydropyrimidine.*—From 25 parts of 3-(p-ethylphenyl)hydrocinnamic acid and 20 parts of 3,5-heptanediamine in 60 parts of xylene is obtained, by the procedure of Example 1A, 4,6-diethyl-2-(p-ethylbenzhydrylmethyl)3,4,5,6-tetrahydropyrimidine, of the formula

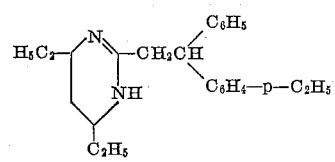

EXAMPLE 17

A. *2 - (p-chlorobenzhydryl) - 5,5 - dimethyl - 3,4,5,6-tetrahydropyrimidine.*—A solution of 25 parts of 2-(p-chlorophenyl)-2-phenylacetic acid and 12 parts of 2,2-dimethyl-1,3-propanediamine in 480 parts of xylene is heated at the boiling point under reflux for 20 hours, water being separated as formed. The reaction mixture is worked up as in Example 10. Upon alkalization of the ether-washed acid extract, an oil is thrown down which crystallizes on standing. The product thus obtained, 2 - (p - chlorobenzhydryl) - 5,5 - dimethyl-3,4,5,6-tetrahydropyrimidine, is further purified by vacuum sublimation. It melts at approximately 110° C. and has the formula

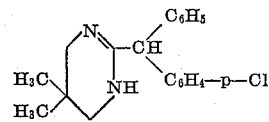

B. *2 - (p - chlorobenzhydryl) - 5,5 - dimethyl - 3,4, 5,6-tetrahydropyrimidine hydrochloride.*—The hydrochloride of the base of the preceding Part A of this example is prepared via the procedure detailed in Example 7B. The 2 - (p - chlorobenzhydryl) - 5,5 - dimethyl - 3,4,5,6-tetrahydropyrimidine hydrochloride thus obtained is filtered from the reaction mixture, washed on the filter with a small amount of butanone, and dried in vacuo at 100° C. overnight. The material melts at 223–224° C.

EXAMPLE 18

*2 - (p - fluorobenzhydryl) - 5,5 - dimethyl - 3,4,5,6-* tetrahydropyrimidine.—From 23 parts of 2-(p-fluorophenyl)-2-phenylacetic acid and 12 parts of 2,2-dimethyl-1,3-propanediamine in 600 parts of xylene is obtained, by the procedure of Example 17A, 2-(p-fluorobenzhydryl)-5,5-dimethyl-3,4,5,6-tetrahydropyrimidine, of the formula

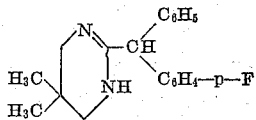

EXAMPLE 19

*2 - (p - bromobenzhydryl) - 5,5 - dimethyl - 3,4,5,6-tetrahydropyrimidine.*—From 29 parts of 2-(p-bromophenyl)-2-phenylacetic acid and 12 parts of 2,2-dimethyl-1,3-propanediamine in 600 parts of xylene is obtained, by the procedure of Example 17A, 2-(p-bromobenzhydryl)-5,5-dimethyl-3,4,5,6-tetrahydropyrimidine, of the formula

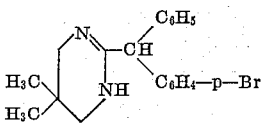

EXAMPLE 20

A. *2 - (β - phenylphenethyl) - 3,4,5,6 - tetrahydropyrimidine.*—A mixture of 23 parts of 2,3-diphenylpropionic acid, approximately 7 parts of 1,3-propanediamine, and 240 parts of xylene is heated at the boiling point under reflux for 24 hours, water being removed as formed in process. The reaction mixture is let stand at room temperatures during formation of a small amount of water-soluble material, which is filtered out and discarded. The filtrate is extracted with dilute muriatic acid, and this extract is filtered and then made alkaline with aqueous caustic. An oil precipitates, which is extracted with ether, whereupon the ethereal extract is dried over anhydrous potassium carbonate and then stripped of solvent by evaporation. The oily residue crystallizes on standing. Recrystallization from butanone affords 2-(β-phenylphenethyl)-3,4,5,6-tetrahydropyrimidine, melting at 121–122° C. The product has the formula

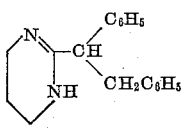

B. *2-(β-phenylphenethyl)-3,4,5,6-tetrahydropyrimidine hydrochloride.*—By the procedure of Example 7B, 2-(β-phenylphenethyl)-3,4,5,6-tetrahydropyrimidine is converted to the corresponding hydrochloric acid addition salt, which is precipitated as a pure, white, crystalline solid.

EXAMPLE 21

A. *2-dibenzylmethyl-3,4,5,6-tetrahydropyrimidine.*—A mixture of 35 parts of dibenzylacetic acid and 11 parts of 1,3-propanediamine in 600 parts of toluene is heated at the boiling point under reflux for approximately 18 hours. One equivalent of hydrogen chloride dissolved in 16 parts of isopropyl alcohol is then introduced, following which solvent is distilled off. The residue is heated to 250° C., then cooled and extracted with dilute aqueous muriatic acid, ether being added to facilitate solution. The aqueous phase is separated, washed with ether, and then made alkaline with aqueous 40 percent caustic soda. The alkaline mixture which results is extracted with ether, and this ether solution is dried over anhydrous potassium carbonate and then stripped of solvent by evaporation at 90–100° C. The colorless, crystalline residue is recrystallized from butanone to give pure 2-dibenzylmethyl-3,4,5,6-tetrahydropyrimidine, the melting point of which is 157–158° C. The product has the formula

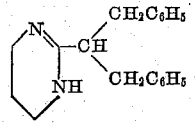

B. *2-dibenzylmethyl-3,4,5,6-tetrahydropyrimidine hydrochloride.*—Using the technique of Example 3C, 5 parts of 2-dibenzylmethyl-3,4,5,6-tetrahydropyrimidine in 40 parts of hot butanone is converted to the corresponding hydrochloric acid addition salt, which precipitates from the reaction mixture on standing in the cold overnight. The white, crystalline product thus obtained melts at 246–247° C.

EXAMPLE 22

A. *5,5-dimethyl-2-(β-phenylphenethyl)-3,4,5,6-tetrahydropyrimidine.*—A mixture of 23 parts of 2,3-diphenylpropionic acid, 10 parts of 2,2-dimethyl-1,3-propanediamine, and 480 parts of xylene is heated at the boiling point under reflux for 2 days, during which water formed in process is concurrently trapped and discarded. Upon standing at room temperatures, the reaction mixture precipitates. The resultant mixture is extracted with dilute aqueous muriatic acid, following which this extract is twice washed with ether, and then made alkaline. The alkaline mixture is extracted with ether, and this ether solution is dried over anhydrous potassium carbonate and then evaporated. The residue is further purified by recrystallization from ethyl acetate. The product thus obtained is 5,5-dimethyl-2-(β-phenylphenethyl)-3,4,5,6-tetrahydropyrimidine, which melts at approximately 134–135° C. and has the formula

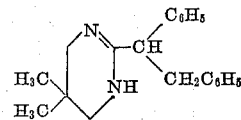

B. *5,5-dimethyl-2-(β-phenylphenethyl)-3,4,5,6-tetrahydropyrimidine hydrochloride.*—To a solution of approximately 4 parts of 5,5-dimethyl-2-(β-phenylphenethyl)-3,4,5,6-tetrahydropyrimidine in 20 parts of hot butanone is added a slight excess of hydrogen chloride dissolved in isopropyl alcohol. Solvent is evaporated, and the residue is washed several times with anhydrous ether, then taken up in a minimum quantity of hot ethyl acetate. As the resultant solution cools, crystallization takes place. The product thus obtained, dried in vacuo at 100° C. for 4 hours, melts at approximately 192° C. This material is 5,5-dimethyl-2-(β-phenylphenethyl) - 3,4,5,6 - tetrahydropyrimidine hydrochloride.

EXAMPLE 23

A. *5,5-dimethyl-2-(α,γ-diphenylpropyl)-3,4,5,6-tetrahydropyrimidine.*—From 24 parts of 2,4-diphenylbutyric acid and 12 parts of 2,2-dimethyl-1,3-propanediamine in 480 parts of xylene is obtained, by the procedure of Example 17A, 5,5-dimethyl-2-(α,γ-diphenylpropyl)-3,4,5,6-tetrahydropyrimidine, melting at approximately 125–125.5° C. The product has the formula

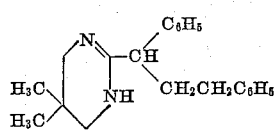

B. *5,5-dimethyl-2-(α,γ-diphenylpropyl)-3,4,5,6-tetrahydropyrimidine hydrochloride.*—Conversion of the base of the preceding Part A of this example to the corresponding hydrochloric acid addition salt is effected by the technique detailed in Example 3C above. The crystalline product, thrown out of the reaction mixture on standing at room temperatures, melts at 200–201° C.

EXAMPLE 24

*4,5,6-trimethyl-2-(β-methyl-β,γ-diphenylpropyl)-3,4,5,6-tetrahydropyrimidine.*—Interaction of 25 parts of 3-benzyl-3-phenylbutyric acid and 11 parts of 3-methyl-2,4-pentanediamine in 500 parts of xylene according to the technique described in the foregoing Example 23A affords 4,5,6-trimethyl-2-(β-methyl-β,γ-diphenylpropyl)-3,4,5,6-tetrahydropyrimidine, having the formula

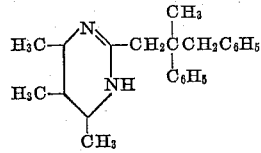

EXAMPLE 25

A. *5,5-dimethyl-2-(α,δ-diphenylbutyl) - 3,4,5,6-tetrahydropyrimidine.*—A solution of 25 parts of 2,5-diphenylpentanoic acid and 12 parts of 2,2-dimethyl-1,3-propanediamine in approximately 500 parts of xylene is heated at the boiling point under reflux overnight, water being removed as formed. The reaction mixture is extracted with dilute aqueous muriatic acid. Upon washing the extract with ether, a precipitate forms. The precipitate is taken up in approximately 3000 parts of hot water, and this solution is treated with decolorizing charcoal and then made alkaline with aqueous caustic soda. A white precipitate is thrown down. The product thus obtained, purified by vacuum sublimation at about 100° C., melts at approximately 106° C. This material is 5,5-dimethyl - 2 - (α,δ - diphenylbutyl) - 3,4,5,6-tetrahydropyrimidine, of the formula

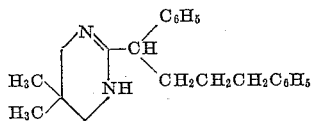

B. *5,5-dimethyl-2-(α,δ-diphenylbutyl) - 3,4,5,6-tetrahydropyrimidine hydrochloride.*—5,5-dimethyl - 2 - (α,δ-diphenylbutyl)-3,4,5,6-tetrahydropyrimidine is converted to the corresponding hydrochloric acid addition salt by the technique of Example 3C. From the reaction mixture, on cooling, there is precipitated as a white solid, 5,5-dimethyl - 2 - (α,δ - diphenylbutyl) - 3,4,5,6 - tetrahydropyrimidine hydrochloride, which melts at approximately 205° C.

EXAMPLE 26

*5,5-dimethyl-2-(γ,δ - diphenylbutyl) - 3,4,5,6 - tetrahydropyrimidine.*—Using the technique of the preceding Example 24A, but substituting an identical quantity of 4,5-diphenylpentanoic acid for the 2,5-diphenylpentanoic acid there called for, there is obtained by condensation with 2,2-dimethyl-1,3-propanediamine in xylene solution, 5,5-dimethyl-2-(γ,δ-diphenylbutyl) - 3,4,5,6 - tetrahydropyrimidine. The product has the formula

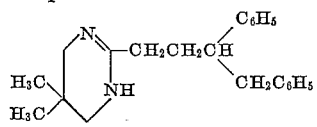

What is claimed is:
1. A compound of the formula

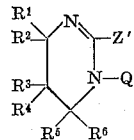

wherein $R^1$, $R^2$, $R^3$, $R^4$, $R^5$, and $R^6$ are selected from the group consisting of hydrogen and lower alkyl radicals; Q is selected from the group consisting of hydrogen and lower alkyl, benzoyl, and lower alkanoyl radicals; and $Z'$ is a lower alkyl radical in which each of two hydrogens is replaced by a member of the group consisting of phenyl, (lower alkyl)phenyl, and halophenyl radicals.

2. A compound of the formula

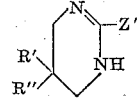

wherein $R'$ and $R''$ are lower alkyl radicals, and $Z''$ is a diphenyl(lower alkyl) radical.

3. 2-benzhydryl - 5,5 - dimethyl - 3,4,5,6 - tetrahydropyrimidine.

4. A compound of the formula

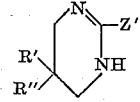

wherein $R'$, and $R''$ are lower alkyl radicals and $Z''$ is a monophenyl(lower alkyl) radical in which the lower alkyl substituent is additionally substituted by a halophenyl radical.

5. 2-(p-chlorobenzhydryl) - 5,5 - dimethyl - 3,4,5,6-tetrahydropyrimidine.

6. A compound of the formula

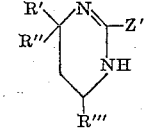

wherein $R'$, $R''$, and $R'''$ are lower alkyl radicals and $Z''$ is a diphenyl(lower alkyl) radical.

7. 2-benzhydryl - 4,6,6 - trimethyl - 3,4,5,6 - tetrahydropyrimidine.

8. In a process for manufacturing compounds of the formula

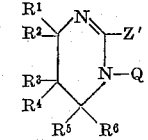

wherein $R^1$, $R^2$, $R^3$, $R^4$, $R^5$, and $R^6$ are selected from the group consisting of hydrogen and lower alkyl radicals; Q is selected from the group consisting of hydrogen and lower alkyl, benzoyl, and lower alkanoyl radicals; and $Z'$ is a lower alkyl radical in which each of two hydrogens is replaced by a member of the group consisting of phenyl, (lower alkyl)phenyl, and halophenyl radicals, the step which comprises contacting an acid of the formula

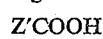

Z'COOH with a diamine of the formula

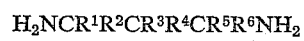

$H_2NCR^1R^2CR^3R^4CR^5R^6NH_2$ in an inert, organic, hydrocarbon, solvent medium at temperatures of the order of 85° to 200° centigrade, $R^1$, $R^2$, $R^3$, $R^4$, $R^5$, $R^6$, and $Z'$ having the meanings hereinbefore assigned.

9. A compound of the formula

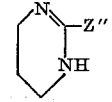

wherein $Z''$ is a diphenyl(lower alkyl) radical.

10. 2 - (β - phenylphenethyl - 3,4,5,6 - tetrahydropyrimidine.

11. A compound of the formula

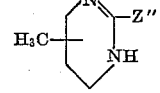

wherein $Z'''$ is a benhydryl radical.

12. 2 - benzhydryl - 5 - methyl - 3,4,5,6 - tetrahydropyrimidine.

References Cited in the file of this patent

UNITED STATES PATENTS 2,516,626   Haury _____ July 20, 1950
2,704,757   Dornfeld _____ Mar. 22, 1955

OTHER REFERENCES

Skinner et al.: Journ. of the American Chemical Society, vol. 73, pp. 3814 to 3815 (1951).

UNITED STATES PATENT OFFICE
CERTIFICATE OF CORRECTION

Patent No. 2,946,791            July 26, 1960

Clinton A. Dornfeld

It is hereby certified that error appears in the printed specification of the above numbered patent requiring correction and that the said Letters Patent should read as corrected below.

Column 2, line 48, for "X'COOH" read -- Z'COOH --; column 6, line 44, for "wased" read -- washed --; column 12, line 68, for "-phenylphenethyl -" read -- -phenylphenethyl)- --.

Signed and sealed this 27th day of December 1960.

(SEAL)
Attest:

KARL H. AXLINE
Attesting Officer

ROBERT C. WATSON
Commissioner of Patents